(12) United States Patent
Bjerre et al.

(10) Patent No.: US 11,307,681 B2
(45) Date of Patent: Apr. 19, 2022

(54) FINGERPRINT SENSING SYSTEM AND METHOD FOR PROVIDING USER INPUT ON AN ELECTRONIC DEVICE USING A FINGERPRINT SENSOR

(71) Applicant: Fingerprint Cards AB, Gothenburg (SE)

(72) Inventors: Troels Bjerre, Valby (DK); Klaus S. Andersen, Hvidovre (DK)

(73) Assignee: FINGERPRINT CARDS ANACATUM IP AB, Gothenburg (SE)

( * ) Notice: Subject to any disclaimer, the term of this patent is extended or adjusted under 35 U.S.C. 154(b) by 0 days.

(21) Appl. No.: 17/051,177

(22) PCT Filed: Apr. 26, 2019

(86) PCT No.: PCT/SE2019/050376
§ 371 (c)(1),
(2) Date: Oct. 28, 2020

(87) PCT Pub. No.: WO2019/212402
PCT Pub. Date: Nov. 7, 2019

(65) Prior Publication Data
US 2021/0232241 A1    Jul. 29, 2021

(30) Foreign Application Priority Data

May 4, 2018  (SE) .................................. 1850531-3

(51) Int. Cl.
*G06K 9/00* (2022.01)
*G06F 3/0354* (2013.01)
(Continued)

(52) U.S. Cl.
CPC ........ *G06F 3/03547* (2013.01); *G06F 1/1626* (2013.01); *G06V 40/1306* (2022.01);
(Continued)

(58) Field of Classification Search
CPC . G06F 3/03547; G06F 1/1626; G06K 9/0002; G06K 9/00087; G06K 9/0008;
(Continued)

(56) References Cited

U.S. PATENT DOCUMENTS 6,408,087 B1   6/2002  Kramer
6,747,631 B1   6/2004  Sakamaki et al.
(Continued)

OTHER PUBLICATIONS

Extended European Search Report dated Jun. 2, 2021 for EP Application No. 19796267.3, 7 pages.
(Continued)

*Primary Examiner* — Abdul-Samad A Adediran
(74) *Attorney, Agent, or Firm* — RMCK Law Group, PLC

(57) ABSTRACT

A method for providing user input on an electronic device comprising a fingerprint sensor comprising an array of sensing elements. Acquiring partial fingerprint images of a finger touching a finger touch surface of the fingerprint sensor from at least two sub-groups of sensing element. Determining a respective force value indicative of a force applied on the finger touch surface at each of the sub-groups of sensing elements when the partial fingerprints were acquired, based on the partial fingerprint images acquired from the respective sub-group of sensing elements. Determining a force value difference between a pair of the determined force values. Determining a user input based on the determined force value difference, and based on the relative location between the sub-groups of sensing elements in the pair associated with the force value difference.

13 Claims, 9 Drawing Sheets

(51) Int. Cl.
*G06V 40/13* (2022.01)
*G06V 40/12* (2022.01)
*G06F 1/16* (2006.01)
*B60K 37/06* (2006.01)

(52) U.S. Cl.
CPC ...... *G06V 40/1359* (2022.01); *G06V 40/1365* (2022.01); *B60K 37/06* (2013.01); *B60K 2370/143* (2019.05); *B60K 2370/782* (2019.05); *G06F 2203/0338* (2013.01)

(58) Field of Classification Search
CPC .......... G06K 9/00073; B60K 2370/782; B60K 2370/143; B60K 37/06; G06V 40/1365; G06V 40/1306
See application file for complete search history.

(56) References Cited

U.S. PATENT DOCUMENTS

| | | | |
|---|---|---|---|
| 7,280,679 B2 | 10/2007 | Russo | |
| 7,460,109 B2 | 12/2008 | Safai et al. | |
| 11,042,186 B2* | 6/2021 | Park | G06F 1/1626 |
| 2005/0012714 A1 | 1/2005 | Russo et al. | |
| 2005/0179657 A1 | 8/2005 | Russo et al. | |
| 2006/0078174 A1 | 4/2006 | Russo | |
| 2009/0267918 A1 | 10/2009 | Lu et al. | |
| 2012/0022799 A1 | 1/2012 | Ikebe | |
| 2017/0168600 A1 | 6/2017 | Setterberg et al. | |
| 2017/0255338 A1 | 9/2017 | Medina et al. | |
| 2018/0032783 A1 | 2/2018 | Wu et al. | |
| 2018/0114046 A1 | 4/2018 | Shimada et al. | |
| 2018/0196982 A1* | 7/2018 | Panchawagh | G06K 9/00073 |
| 2018/0276439 A1 | 9/2018 | Strohmann et al. | |
| 2018/0276440 A1* | 9/2018 | Strohmann | G06K 9/0008 |

OTHER PUBLICATIONS

International Search Report and Written Opinion for International Application No. PCT/SE2019/050376 dated Jun. 20, 2019, 10 pages.

* cited by examiner

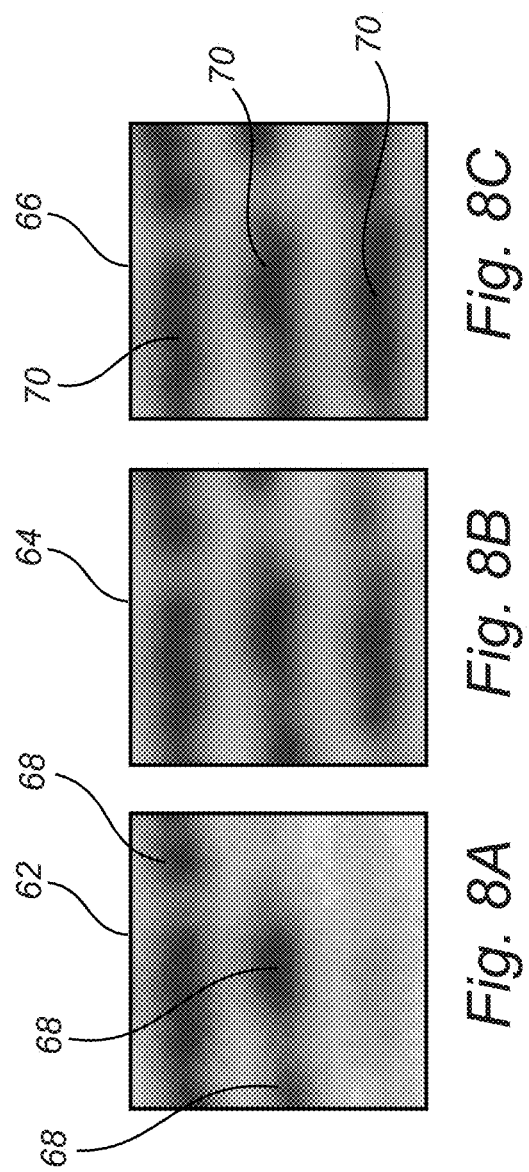

FINGERPRINT SENSING SYSTEM AND METHOD FOR PROVIDING USER INPUT ON AN ELECTRONIC DEVICE USING A FINGERPRINT SENSOR

CROSS-REFERENCE TO RELATED APPLICATIONS

This application is a 371 U.S. National Stage of International Application No. PCT/SE2019/050376, filed Apr. 26, 2019, which claims priority to Swedish Patent Application No. 1850531-3, filed May 4, 2018. The disclosures of each of the above applications are incorporated herein by reference in their entirety.

FIELD OF THE INVENTION

The present invention relates to a method for providing user input on an electronic device using a fingerprint sensor. The invention also relates to a fingerprint sensing system, to an electronic device, and to a vehicle comprising a fingerprint sensing system.

BACKGROUND OF THE INVENTION

Various types of biometric systems are used more and more in order to provide for increased security and/or enhanced user convenience.

In particular, fingerprint sensing systems have been adopted in, for example, consumer electronic devices, thanks to their small form factor, high performance and user acceptance.

In some applications, it would be desirable to be able to use finger touches on a fingerprint sensor for navigation control for an electronic device. With fingerprint sensor navigation, the user may be able to create navigation events by swiping the finger over the sensor.

One example of using a fingerprint sensor for navigation is described in U.S. Pat. No. 6,408,087 which discloses controlling the position of a pointer on a screen by detecting changes in width of fingerprint ridges, or the placing or lifting of the finger on the fingerprint sensor.

However, with prior art solutions such as suggested by U.S. Pat. No. 6,408,087, if the user wants to make more than one swipe event, the user is required to lift the finger from the sensor, move the finger, and then perform another swipe on the sensor in the same or in another direction. These gestures are as such quite inefficient from a finger movement perspective.

Accordingly, there appears to be room for improvements with regards to using a fingerprint sensor for controlling electronic devices.

SUMMARY

In view of above-mentioned and other drawbacks of the prior art, it is an object of the present invention to provide an improved method for providing user input to an electronic device using a fingerprint sensor. It is another object of the invention to provide a fingerprint sensing system with improved user input control for an electronic device or system.

According to a first aspect of the present invention, it is therefore provided a method for determining a user input on an electronic device comprising a fingerprint sensor, the fingerprint sensor comprising an array of sensing elements arranged in relation to a finger touch surface, the method comprises: acquiring partial fingerprint images of a finger touching the finger touch surface from at least two sub-groups of sensing elements; determining a respective force value based on the partial fingerprint images acquired from the respective sub-group of sensing elements, the force values are indicative of a force applied on the finger touch surface at each of the sub-groups of sensing elements when the partial fingerprints were acquired; determining a force value difference between a pair of the determined force values, and, determining the user input based on the determined force value difference, and based on the relative location between the sub-groups of sensing elements in the pair associated with the force value difference.

The present invention is based upon the realization that by measuring force value differences on sub-groups of fingerprint sensing elements it is possible to create user input without the need for the user to lift the finger and provide input with a second touch. In this way, it is possible to emulate a so-called "pointing-stick" functionality or generally a "gesture control" functionality using a fingerprint sensor.

The sub-groups of sensing elements are preferably spatially separate on the full array of sensing elements by sensing elements not in one of the sub-groups.

Through the use of partial fingerprint images for estimating the force value differences there is no need for mounting force sensors underneath the fingerprint sensing elements. Thus, the force is estimated directly from the partial fingerprint images acquired with the fingerprint sensor.

It should also be understood that a fingerprint image need not be an optical image of the fingerprint topography, but may be a two-dimensional gray scale value representation of the fingerprint topography representing measurement signals provided by sensing elements in an array of sensing elements. The sensing elements may function according to any measurement principle capable of providing one or several parameter(s) indicating a depth dimension of the fingerprint topography, so that an analysis of one or several such parameters can be used to estimate a compression of the fingerprint topography resulting from the finger touch on the surface of the fingerprint sensor.

Such measurement principles include certain capacitive measurement techniques, and ultrasonic measurement techniques etc.

The force value difference may be represented by a subtraction between force values or by ratios between force values, any other way capable of indicating a difference between the force values.

The force value must not necessarily be the force per se (i.e. in Newton), but a derivable from the applied force.

Determining a user input may be triggered by various actions, for example that the force value difference fulfills a predetermined criterion, that a predetermined threshold finger coverage of the fingerprint touch surface is fulfilled, or by another finger detect method.

For instance, a user input determination may be initiated when the force difference exceeds a threshold force value difference, e.g. when the subtraction (or the absolute value thereof) between force values exceeds a threshold value.

In embodiments, at least one further force value difference between a respective pair of sub-groups of sensing elements may be determined, and at least one further user input may be determined based on the determined at least one further force value difference, and based on the relative location between the sub-groups of sensing elements in the pairs associated with the at least one further force value difference.

Accordingly, embodiments of the invention advantageously provides for determining user inputs in several dimensions. For each pair of sub-groups of sensing elements may a user input in one navigation dimension be determined on the electronic device. The navigation dimension is preferably the same as the relative location of the sub-groups of sensing elements in the respective pair.

According to embodiments, there may be included to combine at least a first force value difference, a second force value difference, and the relative location between the sensing elements in the respective pair to determine the user input.

Thus, more complex user inputs may be created by combining force value differences from more than one sub-group pair of sensing elements.

In some embodiments, a first user input may be executed on the electronic device, then shifting from executing the first user input to executing a second user input by determining a continuous variation in force distribution on the sensing elements in the respective pair. The shifting in execution of user inputs may be performed without the need for the user to lift the finger from the finger touch surface.

The relative location of the pair of sensing elements may provide directionality for the user input, and the amount of force value difference may provide a speed indication for the user input. Hereby a user-friendly user input control is provided.

The sub-groups of sensing elements may advantageously be non-overlapping sub-groups.

According to a second aspect of the present invention, there is provided a fingerprint sensing system comprising: a finger touch surface for receiving a finger having a fingerprint topography; an array of sensing elements; fingerprint image acquisition circuitry connected to the array of sensing elements for acquiring fingerprint images indicating local distances between the sensing elements and the fingerprint topography; and image processing circuitry connected to the fingerprint image acquisition circuitry for: controlling the fingerprint image acquisition circuitry to acquire a first time-sequence of partial fingerprint images from at least two sub-groups of sensing elements; determining a force applied on each of the sub-groups of sensing elements, based on the partial fingerprint images acquired from the respective sub-group of sensing elements; determine a force value difference between a pair of the determined forces applied on sub-groups of sensing elements, and determining a user input for an electronic device based on the determined force value difference, and based on the relative location between the sub-groups of sensing elements in the pair associated with the force value difference.

In some embodiments there may be four sub-groups of sensing elements.

Two sub-groups of sensing elements may be arranged in an up-down orientation of finger touch surface, and two sub-groups of sensing elements are arranged in a left-right orientation. Thus, the user is hereby provided with navigation control in along two intuitive axes. Up-down may be recognized as "north-south" in the array on sensing elements, and left-right may be recognized as "west-east" in the array on sensing elements.

In some embodiments, each sensing element in the array of sensing elements may comprise an electrically conducting sensing structure; and the fingerprint acquisition circuitry may be connected to each of the sensing structures for providing sensing signals indicative of a capacitive coupling between each sensing structure and the finger in response to a change in potential difference between a finger potential of the finger and a sensing structure potential of the sensing structure. Thus, fingerprint sensing functionality may be provided in the form of a capacitive fingerprint sensor.

Moreover, each sensing structure may advantageously be provided in the form of a metal plate, so that the equivalence of a parallel plate capacitor is formed by the sensing structure (the sensing plate), the local finger surface, and the protective dielectric top layer (and any air that may locally exist between the local finger surface and the protective layer, depending on location of ridges and valleys in the fingerprint pattern). A change of the charge carried by the sensing structure resulting from the change in potential difference between the finger and the sensing structure is an indication of the capacitance of such a parallel plate capacitor, which is in turn an indication of the distance between the sensing structure and the finger surface. Thereby, an image of the fingerprint pattern can be acquired by means of determining the capacitive coupling between each sensing structure and the finger.

The protective top dielectric structure, which also may be referred to as a coating, may advantageously be at least 20 µm thick and have a high dielectric strength to protect the underlying structures of the fingerprint sensing device from wear and tear as well as from electrostatic discharge (ESD). Even more advantageously, the protective top layer may be approximately 100 µm thick, or in the range of 500-700 µm thick, or even thicker.

The sensing signals may be analog values indicative of a voltage, which may in turn be proportional to the capacitance of the capacitor constituted by the finger (or other conductive object in the vicinity of the finger detecting structure), the finger detecting structure and the dielectric material there between.

Further embodiments of, and effects obtained through this second aspect of the present invention are largely analogous to those described above for the first aspect of the invention.

According to a third aspect of the invention, there is provided an electronic device comprising: the fingerprint sensing system according to the second aspect or embodiments thereof; and a device control unit configured to: execute the user input on the electronic device based on the determined force value difference.

The device controller may be configured to: interact with the fingerprint sensing system to authenticate a user based on a fingerprint representation; and perform at least one action only if the user is authenticated based on the fingerprint representation.

According to a fourth aspect of the invention, there is provided a vehicle comprising the fingerprint sensing system according to the second aspect or embodiments thereof, electronic vehicle system, and a vehicle control unit configured to: execute the user input on an electronic vehicle system based on the determined force value difference.

Further features of, and advantages with, the present invention will become apparent when studying the appended claims and the following description. The skilled addressee realize that different features of the present invention may be combined to create embodiments other than those described in the following, without departing from the scope of the present invention.

BRIEF DESCRIPTION OF THE DRAWINGS

These and other aspects of the present invention will now be described in more detail, with reference to the appended drawings showing an example embodiment of the invention, wherein:

FIGS. 8A-C schematically show three different partial fingerprint images in a time-sequence of partial fingerprint images;

DETAILED DESCRIPTION OF EXAMPLE EMBODIMENTS

In the present detailed description, various embodiments of the method and electronic device according to the present invention are mainly described with reference to a substantially square fingerprint sensor arranged adjacent to the touch display of a mobile phone.

It should be noted that this by no means limits the scope of the present invention, which equally well includes, for example, other electronic devices such as tablets, computers or watches. Furthermore, the fingerprint sensor may have any other shape. For instance, the fingerprint sensor may be provided as an elongated rectangle.

Figure 1:
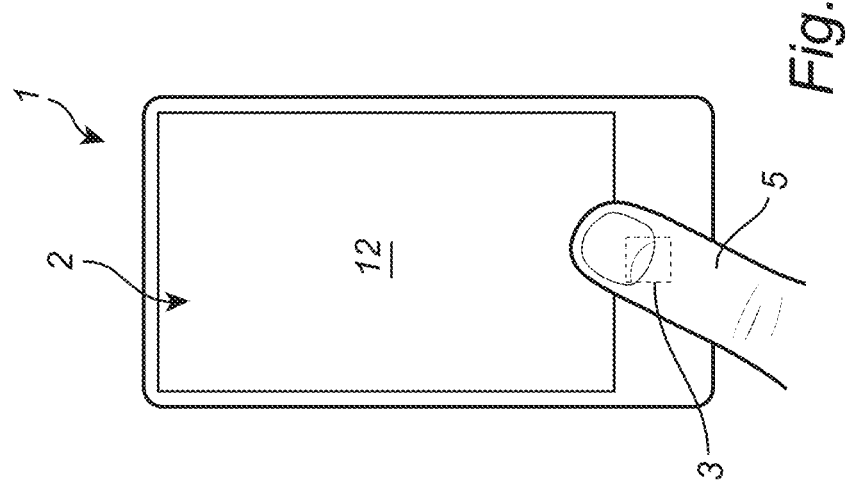
FIG. 1 schematically illustrates an electronic device including a fingerprint sensor according to an example embodiment of the present invention.

Referring to FIG. 1, an electronic device, here in the form of mobile phone 1, comprises a touch display 2 and a fingerprint sensor 3. The touch display 2 comprises a touch sensor for touch-based control of the mobile phone 1 and a display acting as a user interface.

In FIG. 1, a finger 5 of the user of the mobile phone 1 makes a finger touch on the surface of the fingerprint sensor 3. The finger touch may be made in connection with an authentication attempt. However, with the inventive concept the user may also navigate through menus and applications on the electronic device using finger touch on the fingerprint sensor 3 surface. Other types of user input apart from navigation may be music track selection, browsing pages of documents, scrolling, volume control, tapping, etc.

Figure 2:
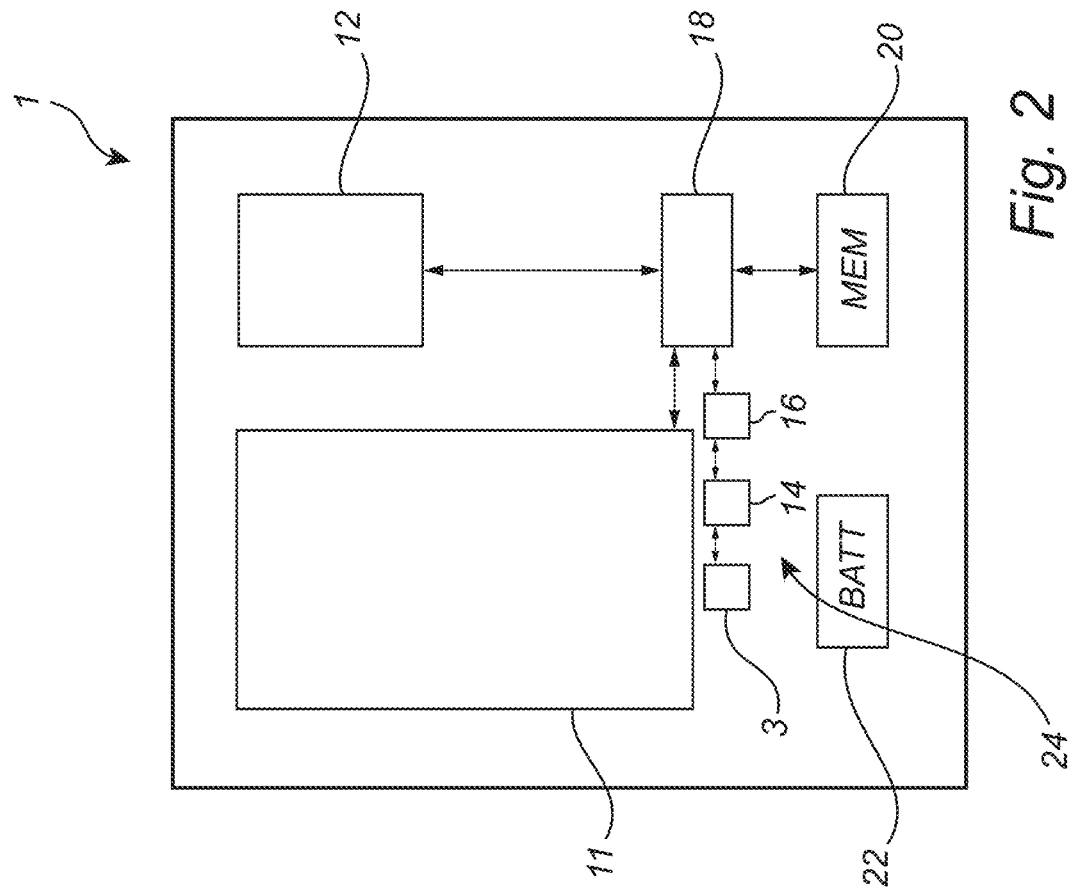
FIG. 2 is a block diagram of the electronic device in FIG. 1.

Referring to the block diagram in FIG. 2, the electronic device 1 in FIG. 1 comprises, in addition to the fingerprint sensor 3, a touch sensor 11, a display 12, fingerprint image acquisition circuitry 14, image processing circuitry 16, a device control unit 18, a memory 20, and a battery 22 for providing electrical energy to the various components of the electronic device 1. Although not shown in FIG. 2, the electronic device may comprise further components depending on application. For instance, the electronic device 1 may comprise circuitry for wireless communication, circuitry for voice communication, a keyboard etc.

Figure 3:
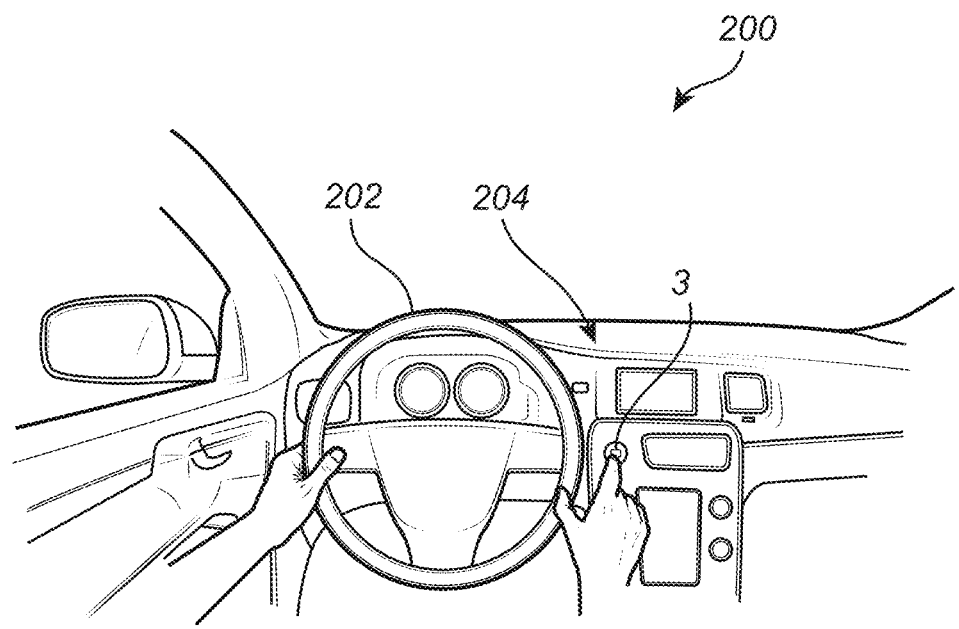
FIG. 3 schematically illustrates a vehicle interior with an electronic entertainment system including a fingerprint sensor according to an example embodiment of the present invention.

In a further possible implementation of the invention the fingerprint sensor 3 may be comprised in a vehicle 200 as conceptually illustrated in FIG. 3. The fingerprint sensing system 24 of the fingerprint sensor 3 may for example be configured for identification driver or a passenger in order to configure an electronic vehicle system such as electronic entertainment system according to personalized settings. The fingerprint sensing system 24 is also configured for navigation of menus or controlling settings of the entertainment system or another electronic vehicle system. Thus an electronic device in accordance with the inventive concept may be an electronic vehicle system such as an electronic entertainment system of a vehicle.

The finger touch surface of the fingerprint sensor 3 for receiving a finger may for example be arranged on the steering wheel 202, or as illustrated in FIG. 3 in relation to the control panel 204 either in the front seat of the vehicle or for passengers in the rear seat. Exemplary functionalities include that user input in one direction across the finger touch surface of the fingerprint sensor 3 may control the sound volume of an entertainment system in the vehicle and left/right user input may control music track selection. Additional user input may comprise moving around on an electronic map in a GPS.

Figure 4:
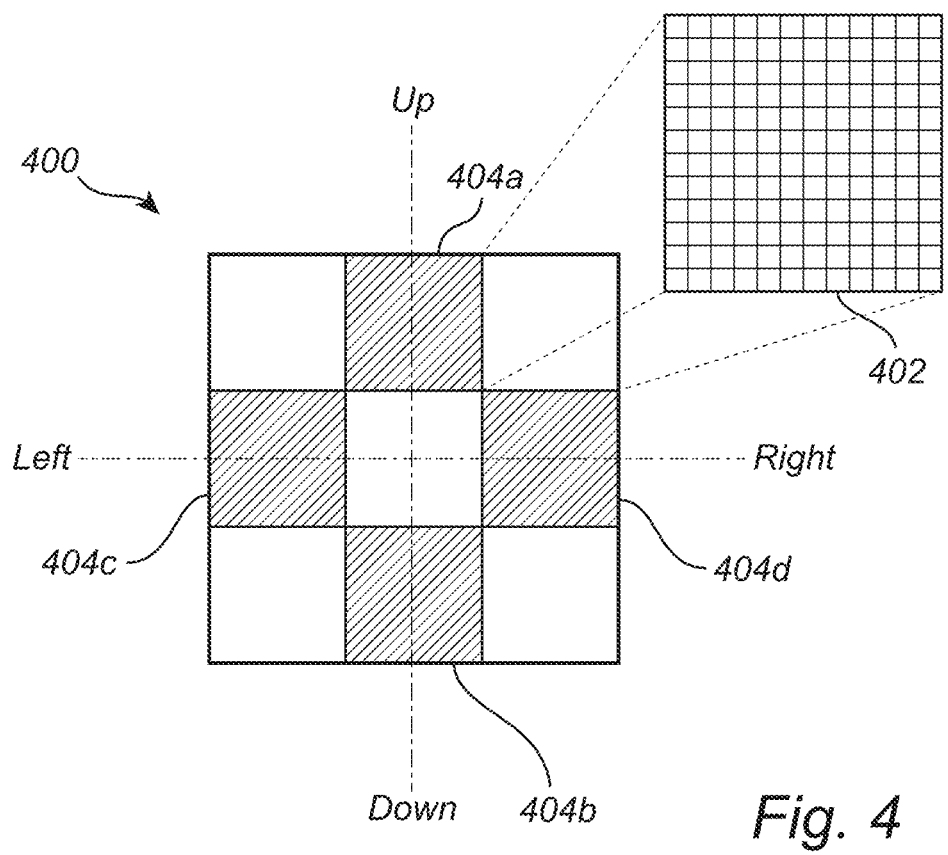
FIG. 4 conceptually illustrates an array of sensing elements comprising several sub-groups of sensing elements.

FIG. 4 conceptually illustrates an array 400 of sensing elements 402 comprising several sub-groups 404a-d of sensing elements. In this example embodiment there are four sub-groups of sensing elements, sub-groups 404a and 404b arranged along an axis stretching in a up-down orientation across the array 400 of sensing elements, and sub-groups 404c and 404d arranged along an axis stretching in a left-right orientation across the array 400 of sensing elements. The sub-groups 404a and 404b form a first pair of sub-groups and the sub-groups 404c and 404d form a second pair of sub-groups.

Partial fingerprint images may be acquired using at least two of the sub-groups 404a-d of sensing elements. A force applied on each of the sub-groups, e.g. sub-groups 404a-b may be determined from the respective acquired partial fingerprint image. Determining of a force value may be performed with various methodologies and only a few selected ones are described below.

A force value difference between the forces determined to have been applied on sub-groups 404a and 404b is used for determining a user input. Analogously, a force value difference determined between the forces determined to have been applied on the sub-groups 404c and 404d is used for determining another user input. Furthermore, a combined user input may be created by combination of determined force differences. In other words, up/down and left/right force value differences can be combined to form a force direction vector which can be used for any number of navigation purposes such as navigating maps, spreadsheets, app feeds etc.

The relative location between the sub-groups 404a-d in each pair (i.e. the pair comprising sub-groups 404a-b, and the pair comprising sub-groups 404c-d) may be used for providing an intuitive user input to an electronic device. Up/down and left/right force difference can be used as gestures to perform a context-based action on the electronic device, such as turning volume up/down, scrolling, music track selection, document selection, map navigation, etc. For instance a force difference determined from the sub-groups 404a-b may be used for volume control or up/down scrolling in menus or documents on an electronic device.

The user will not have to move the finger back and forth over the finger touch surface to trigger new user inputs. User inputs can be triggered by rolling/pushing the finger on the fingerprint sensor surface.

Figure 5B:
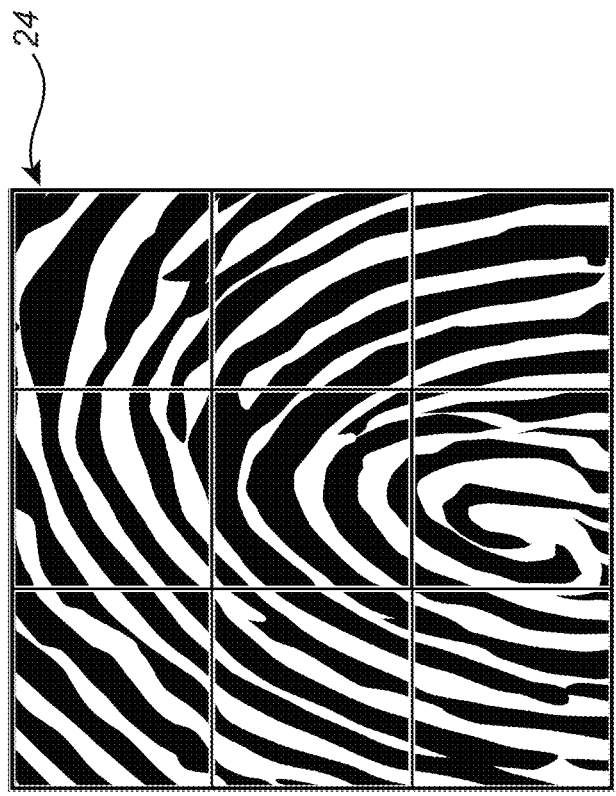
FIGS. 5A-C are example illustrations of fingerprint images used for determining user inputs according to embodiments of the present invention.
Figure 5C:
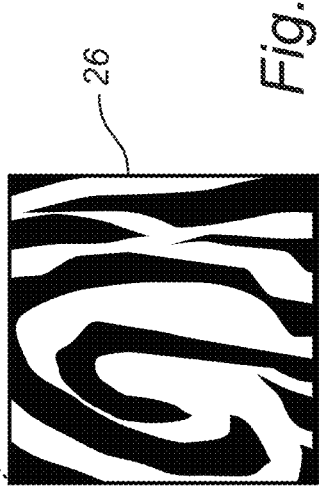
Figure 5A:
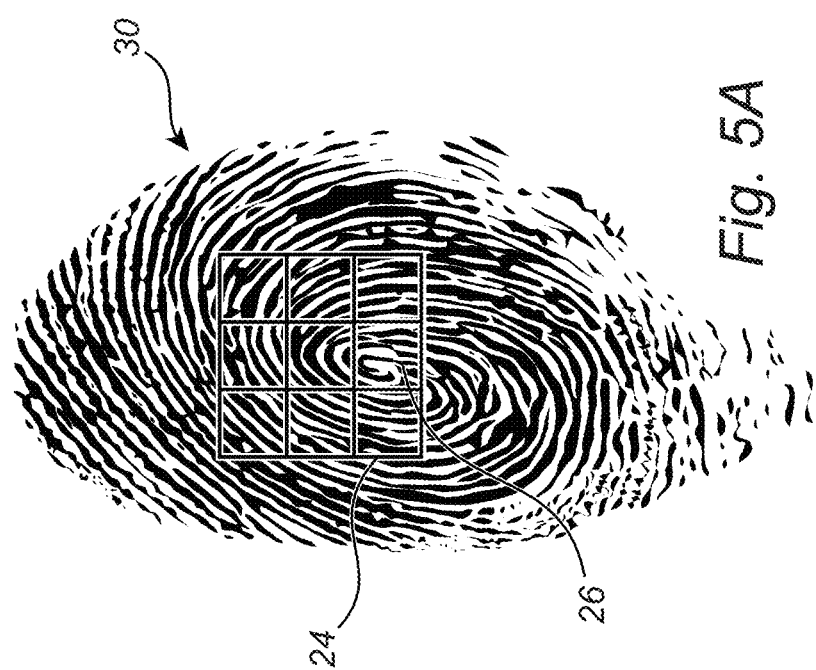

An illustration of a representative size of the array 400 of sensing elements of the fingerprint sensor 3 is provided in FIG. 5A, where a full fingerprint image 24 (which may for example be used for authentication) acquired using the full fingerprint sensor surface, and a partial fingerprint image 26 acquired using a fingerprint sensor sub-group are shown together with a typical two-dimensional (2D) representation of a fingerprint topography 30.

FIG. 5B is an enlargement of the full fingerprint image 24, and the partial fingerprint image 26, and FIG. 5C is a further enlarged view of the partial fingerprint image 26.

Figure 6A:
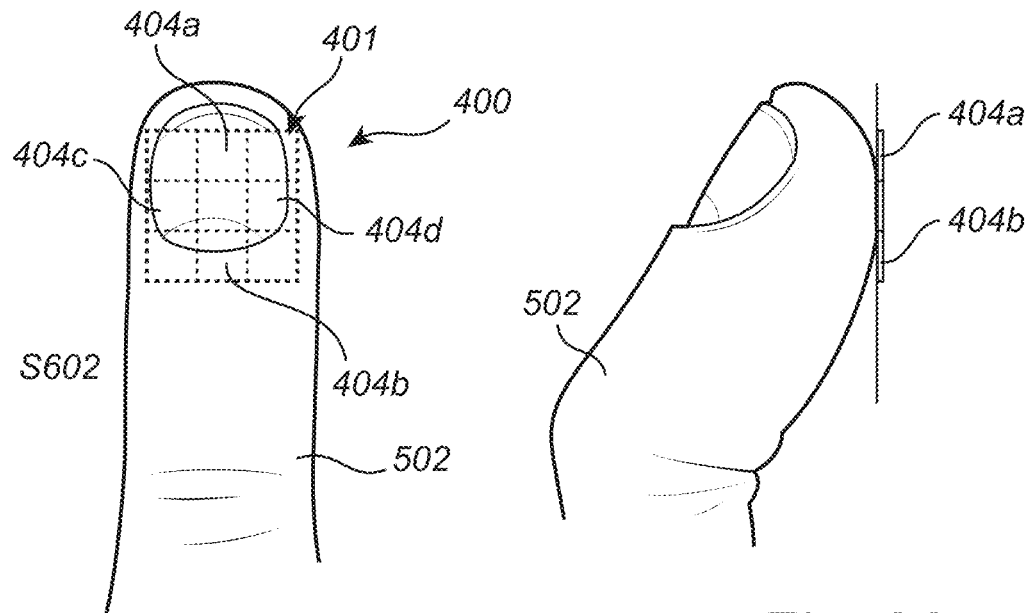
FIG. 6A-C schematically illustrates a first example of determining a user input.
Figure 6B:
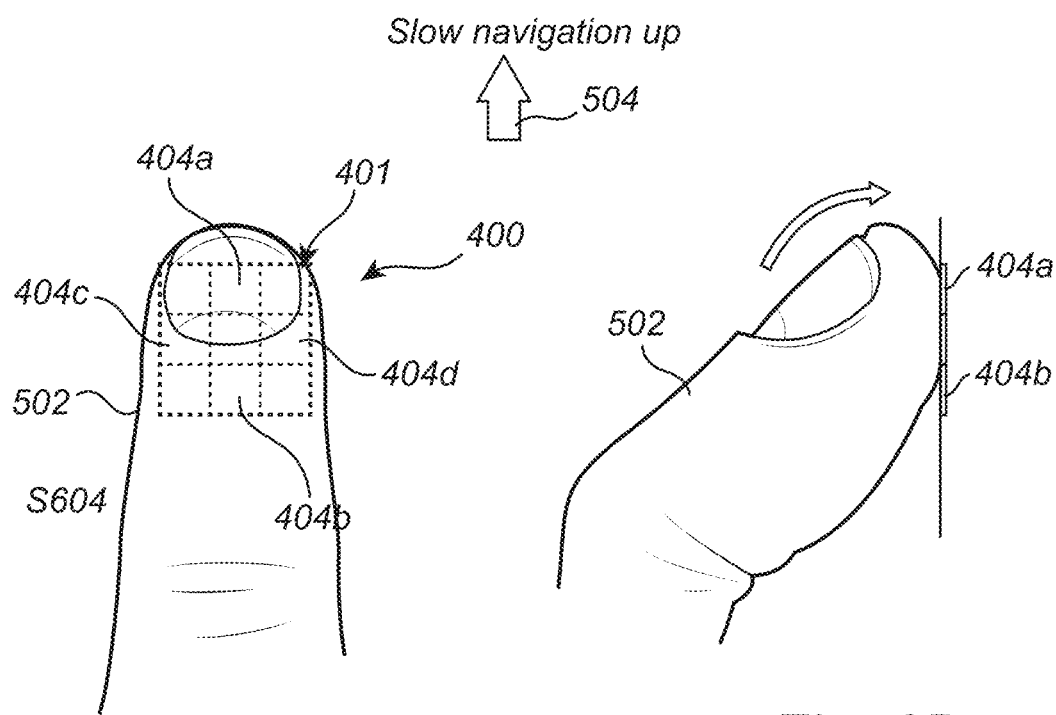
Figure 6C:
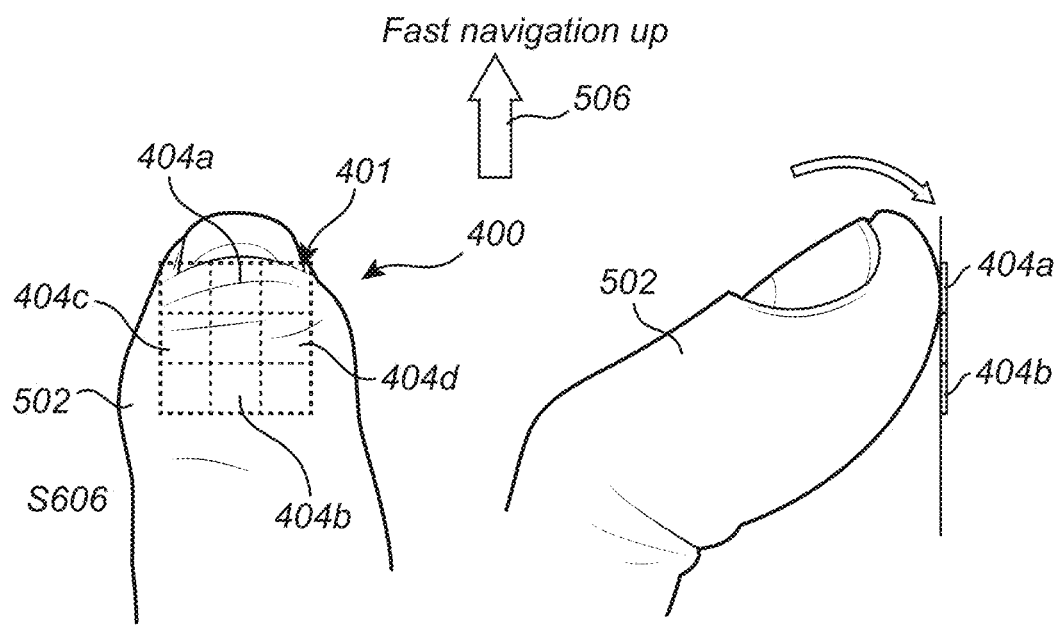

FIG. 6A-C conceptually illustrates a finger movement on the finger touch surface 401 of a fingerprint sensor comprising an array 400 of sensing elements. In exemplified embodiment in FIG. 6A-C the force value difference is described as a subtraction between the determined force values. Another possible force difference is to take ratios between the force values determined from sub-groups of sensing elements. In case of using a subtraction the sign of the difference may be used for determining directionality of the user input.

In step S602 illustrated in FIG. 6A a finger 502 is received on the finger touch surface 401. The fingerprint sensor firstly detects the presence of the finger on the finger touch surface 401 and thereby activates the array 400 of sensing elements. In this example the finger 502 is received on finger touch surface such that the forces on the sub-groups 404a-d of sensing elements are at least nearly equal. Thus the force value difference between the forces applied on pairs sub-groups 404a-b, and 404b-c of sensing elements does not exceed a threshold force value difference. It is when the force value difference (e.g. an absolute value of the subtracted force values) exceeds the predetermined threshold force difference that a user input is subsequently determined.

Next, in step S604 illustrated in FIG. 6B, the finger 502 has shifted somewhat up ("north") on the array 400 of sensing elements. The finger has "rolled" in the direction of the sub-group 404a to thereby apply a higher force on the sub-group 404a than on the other sub-groups 404b-d. A determined force value difference between the forces applied on the sub-group 404a compared to the sub-group 404b exceeds the threshold force difference. The force value difference indicates a user input in a predetermined direction and with a speed as schematically indicated by the arrow 504. The user input direction (here shown as a navigation direction) may be related to the relative orientation of the sub-groups 404a and 404b. The navigation speed (i.e. the speed of the user input) may be determined based on the magnitude of the force value difference, i.e. a larger force value difference means a higher navigation speed. The speed may relate to a browsing or scrolling speed, or to a speed of a cursor moving on a display, to mention a few examples.

Subsequently, the finger has rolled even further towards the location of the sub-group 404a in step S606 illustrated in FIG. 6C. As a result, the user input speed increases as schematically indicated by the arrow 506 which is somewhat larger than the arrow 504.

In each of the steps S602, S604, S606, the force value difference determined based on the forces applied on the sub-groups 404c-d is assumed to be below the threshold force difference such that no user input is determined therefrom. As will now be described with reference to FIG. 7 a combined force direction vector may be determined from combinations of force value differences.

Figure 7A:
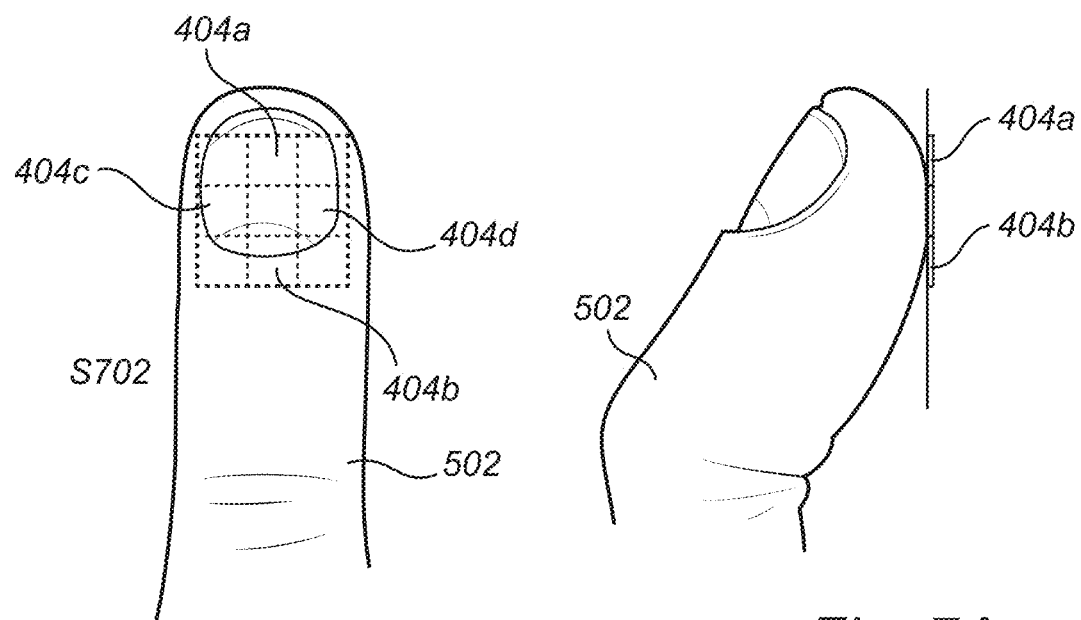
FIG. 7A-C schematically illustrates another example of determining a user input.
Figure 7B:
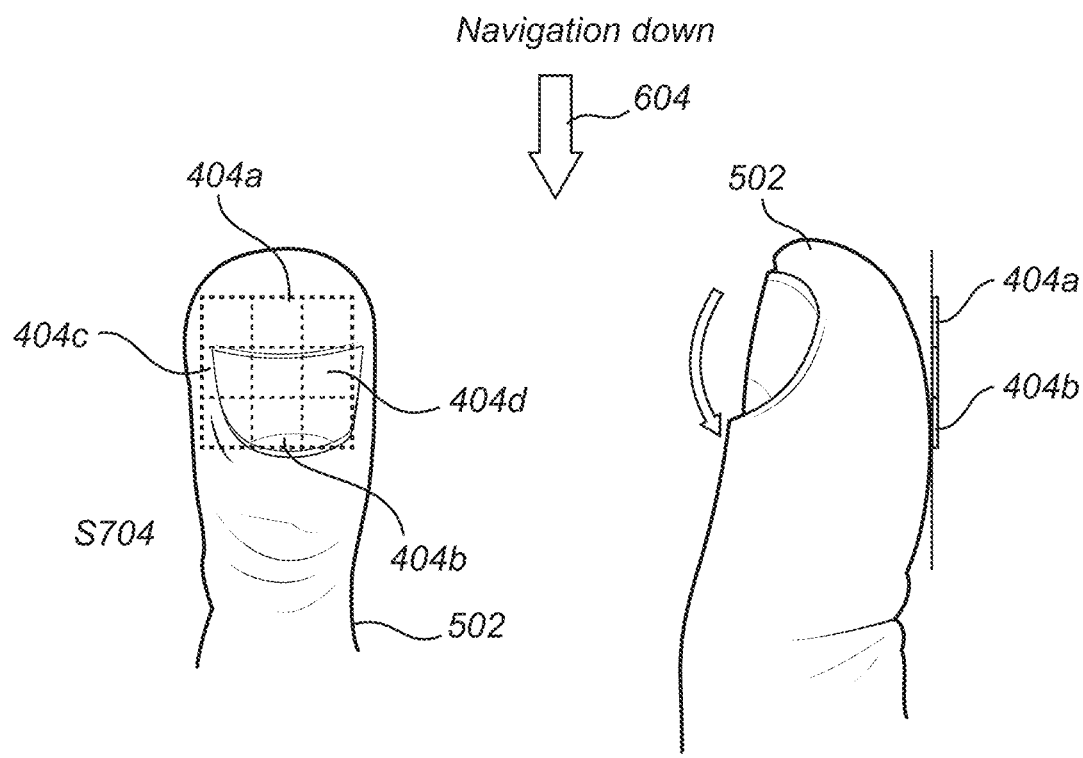

In step S702 of FIG. 7A a finger 502 is located on the finger touch surface 401 such that the forces on the sub-groups 404a-d of sensing elements are at least nearly equal. Thus the force value differences between the forces applied on the sub-groups 404a-d of sensing elements are below a threshold force difference.

Next, in step S704 (FIG. 7B), the finger 502 has shifted somewhat down on the array 400 of sensing elements. The finger has "rolled" in the direction of the sub-group 404b to thereby apply a higher force on the sub-group 404b than on any of the other sub-groups 404a, 404c, 404d of sensing elements. A force value difference determined between the forces applied on the sub-group 401b compared to the sub-group 404a indicates a force value difference that exceeds the threshold force difference. Consequently, a user input in a predetermined direction and with a speed may be determined as is schematically indicated by the arrow 604, similarly to what was described with reference to FIGS. 6B-C.

Figure 7C:
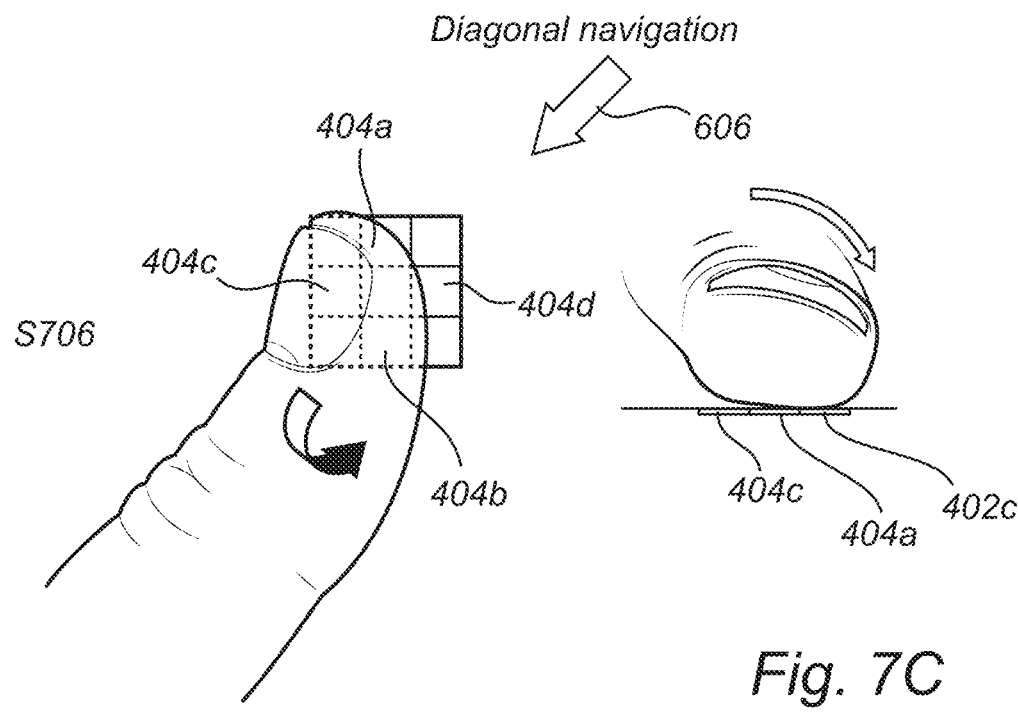

In step S706 shown in FIG. 7C the finger 502 has rolled to the left on the finger touch surface 401 across the array 400. The finger still applies a higher force on the sub-group 404b compared to the force on the sub-group 404a resulting in a force vector down as described in step S704. However, the finger also applies a higher force on the sub-group 404c compared to the force on the sub-group 404d resulting in a force vector to the left. A combination of the force vectors provides a combined force vector indicative of user input diagonally down to the left as indicated by the arrow 606.

It should be noted that the example user inputs and shift in user inputs are executed by continuous monitoring of the force value differences in pairs of sub-groups, and that the finger need not be lifted from the finger touch surface 401 of the fingerprint sensor when shifting between user inputs or for producing user input from combined force vectors. Thus, user inputs may be created by the user by shifting the force distribution of the applied force on the fingerprint sensor.

The force value indicative of the force applied by a finger touching the finger touch surface at the respective sub-group may be determined from the acquired partial fingerprint images in various ways, and some exemplary method will next be briefly described.

FIGS. 8A-C schematically show three different partial fingerprint images 62, 64, and 66 in a time-sequence of partial fingerprint images. In the example of FIGS. 8A-C, the ridges of the fingerprint topography initially make point contact. With increasing finger pressure on the sensor surface, the points 68 grow to lines, which eventually meet to form continuous ridges 70. Thus, it is possible to relate the topological changes in the fingerprint from the sequence of images to the applied force on the fingerprint sensor.

A force value may be a relative force based on a sequence of partial fingerprint images from each of the sub-groups of sensing elements, wherein one partial fingerprint image from each sub-group is selected as a reference fingerprint image for that sub-group. At least one subsequent partial fingerprint image (e.g. image 64 or 66) from each sub-group is thereafter analyzed and compared with the selected reference image (62) to detect differences between the images which may be indicative of topological changes in the fingerprint due to that the finger is pressed against the fingerprint sensor as is conceptually illustrated in FIGS. 8A-C. For example, a change in ridge width or valley depth determined from at least two partial fingerprint images from the same sub-group may be used for determining a relative change in applied force.

Another possible evaluation for determining the change in applied force on the sub-groups of sensing elements may be based on that the image intensity changes between successive fingerprint images (62, 64, 66). Thus, one possible way to determine the relative applied force may be to analyze histograms of pixel values from the images in the sequence of images (62, 64, 66). In this case, it may be possible to estimate force values by determining a "higher" image intensity and a "lower" image intensity from a first reference fingerprint image (e.g. image 62), subsequently, determining a "higher" image intensity and a "lower" image intensity from a second reference fingerprint image (e.g. image 64). It is then possible to determine a first intensity range from the difference between the higher intensity and the lower intensity in the first image 62, and a second intensity range from the difference between the higher intensity and the lower intensity in the second image 64. The force applied in the sub-group of sensing elements of the fingerprint sensor may be based on e.g. a difference between the higher intensities of the images, and/or a difference between the first intensity range and the second intensity range.

Figure 9:
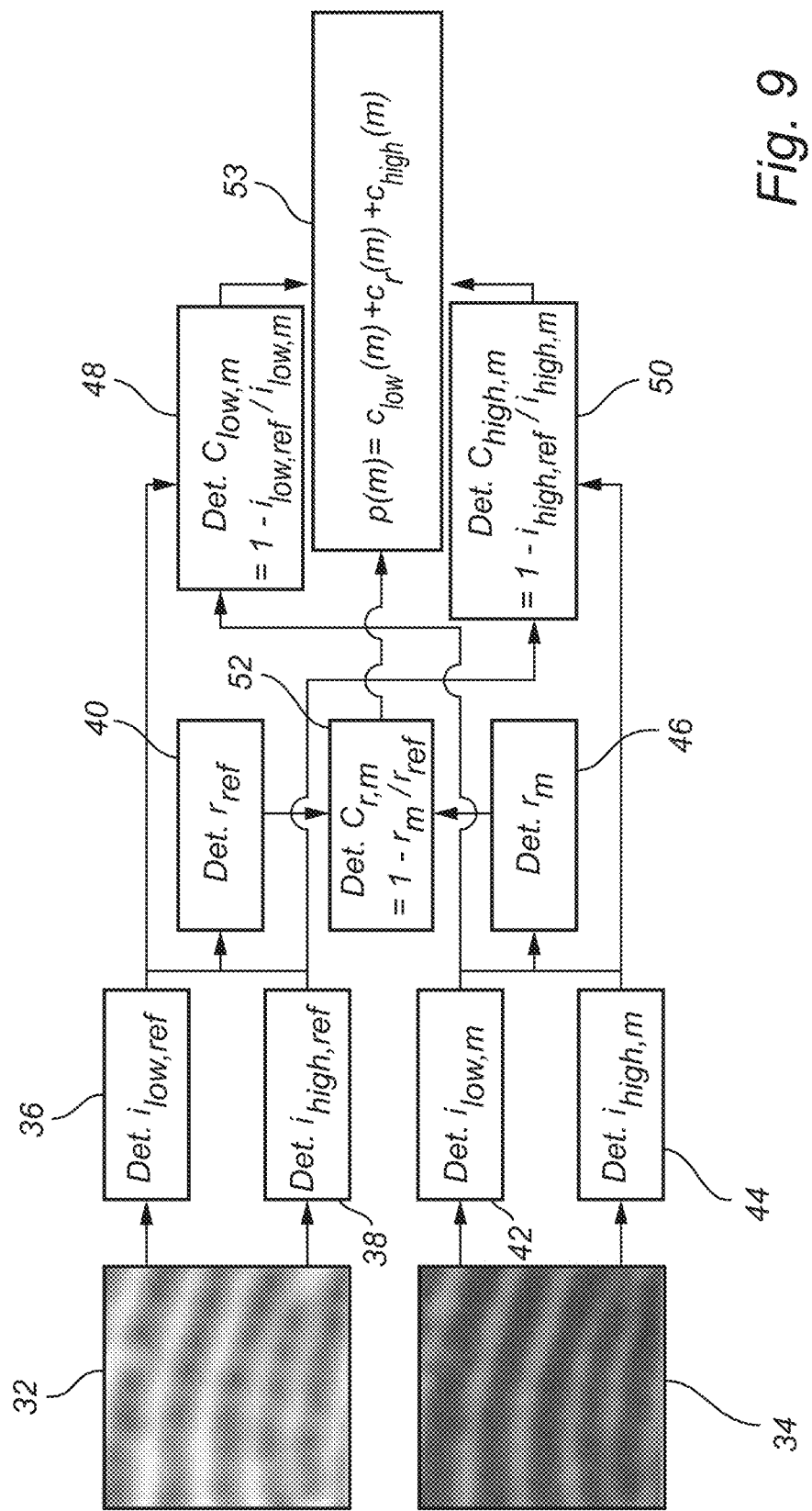
FIG. 9 is a schematic illustration of determination of a force value from partial fingerprint images acquired from a sub-group of sensing elements.

FIG. 9 is a schematic illustration of determination of a force value from partial fingerprint images acquired from a sub-group of sensing elements. A reference fingerprint image 32 has been selected following an evaluation of fingerprint images in a first time-sequence of fingerprint images.

In the presently illustrated example, reference values of three different image-related parameters indicative of a compression of the fingerprint topography are determined based on the reference fingerprint image 32, and corresponding test values of the same image-related parameters are determined based on the test fingerprint image 34.

The first reference value $i_{low,ref}$ relates to the lowest image intensity of the reference partial fingerprint image 32, which is a first image-related parameter indicating a minimum sensed distance between the fingerprint sensor and the fingerprint topography, see box 36 in FIG. 9.

The second reference value $i_{high,ref}$ relates to the highest image intensity of the reference fingerprint image 32, which is a second image-related parameter indicating a maximum sensed distance between the fingerprint sensor and the fingerprint topography, see box 38 in FIG. 9.

The third reference value $r_{ref}$ relates to the image intensity range of the reference fingerprint image 32, which is a third image-related parameter indicating a difference between a minimum sensed distance and a maximum sensed distance between the fingerprint sensor and the fingerprint topography, see box 40 in FIG. 9.

The first test value $i_{low,m}$ relates to the lowest image intensity of the test fingerprint image 34 (image m in a sequence of images), which is a first image-related parameter indicating a minimum sensed distance between the fingerprint sensor and the fingerprint topography, see box 42 in FIG. 9.

The second test value $i_{high,m}$ relates to the highest image intensity of the test fingerprint image 34, which is a second image-related parameter indicating a maximum sensed distance between the fingerprint sensor and the fingerprint topography, see box 44 in FIG. 9.

The third test value $r_m$ relates to the image intensity range of the test fingerprint image 34, which is a third image-related parameter indicating a difference between a minimum sensed distance and a maximum sensed distance between the fingerprint sensor and the fingerprint topography, see box 46 in FIG. 9.

A first relation $c_{low,m}$ between the first test value $i_{low,m}$ and the first reference value $i_{low,ref}$ indicates the negative change of the lowest intensity in the test fingerprint image 34 in relation to the reference fingerprint image 32, see box 48 in FIG. 9.

A second relation $c_{high,m}$ between the second test value $i_{high,m}$ and the second reference value $i_{high,ref}$ indicates the negative change of the highest intensity in the test fingerprint image 34 in relation to the reference fingerprint image 32, see box 50 in FIG. 9.

A third relation $c_{r,m}$ between the third test value $r_m$ and the third reference value $r_{ref}$ indicates the negative change of the intensity range in the test fingerprint image 34 in relation to the reference fingerprint image 32, see box 52 in FIG. 9.

As is indicated in FIG. 9 (box 53), the force applied on the finger touch surface at one of the sub-groups of sensing elements is estimated by:

$$p(m)=c_{low}(m)+c_r(m)+c_{high}(m)$$

which provides a force value p(m) for use in determining forced value differences and subsequently user inputs.

Figure 10:
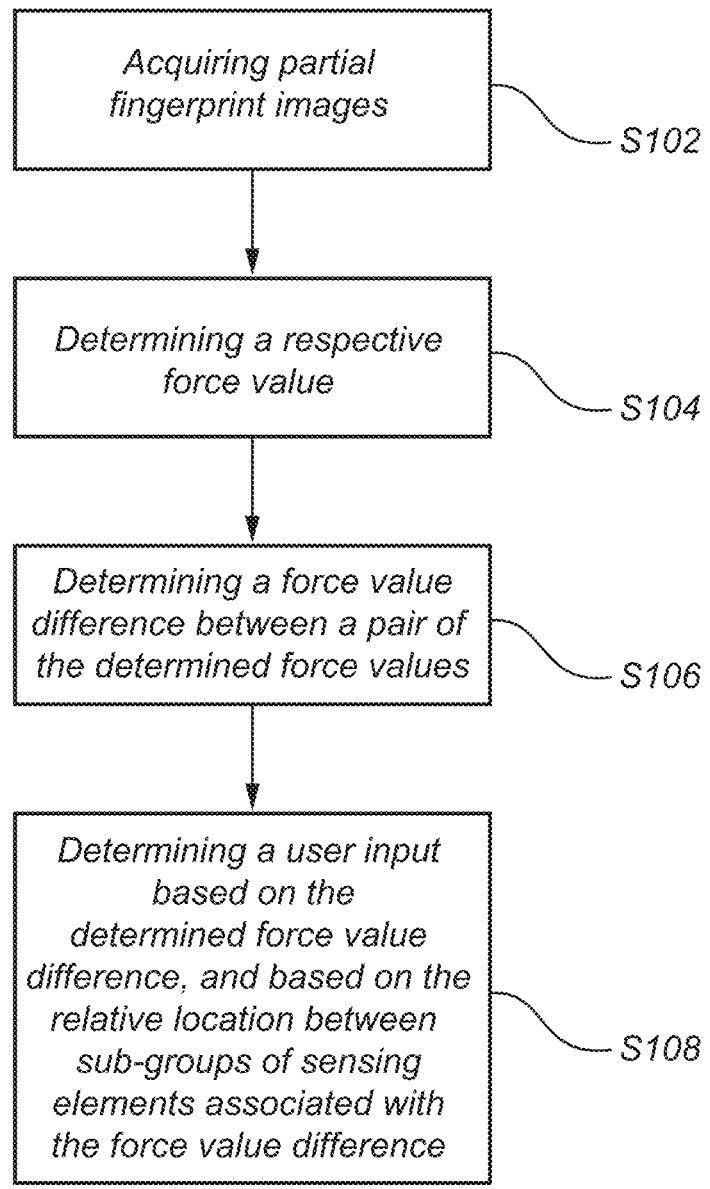
FIG. 10 is a flow-chart of method steps according to embodiments.

FIG. 10 is a flow chart of method steps in accordance with embodiments. In step S102 partial fingerprint images are acquired of a finger touching a finger touch surface of the fingerprint sensor from at least two sub-groups of sensing element. Subsequently is a respective force value determined S104 indicative of a force applied on the finger touch surface at each of the sub-groups of sensing elements when the partial fingerprints were acquired, based on the partial fingerprint images acquired from the respective sub-group of sensing elements. Next S106 a force value difference is determined between a pair of the determined force values. In subsequent step S108 a user input is determined based on the determined force value difference, and based on the relative location between the sub-groups of sensing elements in the pair associated with the force value difference.

A control unit (e.g. a controller) in the invention may include a microprocessor, microcontroller, programmable digital signal processor or another programmable device. The control unit may also, or instead, each include an application specific integrated circuit, a programmable gate array or programmable array logic, a programmable logic device, or a digital signal processor. Where the control unit includes a programmable device such as the microprocessor, microcontroller or programmable digital signal processor mentioned above, the processor may further include computer executable code that controls operation of the programmable device. It should be understood that all or some parts of the functionality provided by means of the control unit (or generally discussed as "processing circuitry") may be at least partly integrated with the fingerprint sensor, or may be part of the electronic device.

The control functionality of the present disclosure may be implemented using existing computer processors, or by a special purpose computer processor for an appropriate system, incorporated for this or another purpose, or by a hardwire system. Embodiments within the scope of the present disclosure include program products comprising machine-readable medium for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures may show a sequence the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

Additionally, even though the invention has been described with reference to specific exemplifying embodiments thereof, many different alterations, modifications and the like will become apparent for those skilled in the art.

In addition, variations to the disclosed embodiments can be understood and effected by the skilled addressee in practicing the claimed invention, from a study of the drawings, the disclosure, and the appended claims. Furthermore, in the claims, the word "comprising" does not exclude other elements or steps, and the indefinite article "a" or "an" does not exclude a plurality.

The invention claimed is:

1. A method for determining a user input on an electronic device comprising a fingerprint sensor, the fingerprint sensor comprising an array of sensing elements arranged in relation to a finger touch surface, the method comprises:
   acquiring partial fingerprint images of a finger touching the finger touch surface from at least two sub-groups of sensing elements;
   determining a respective force value based on the partial fingerprint images acquired from each sub-group of sensing elements, the force values are indicative of a force applied on the finger touch surface at each of the sub-groups of sensing elements when the partial fingerprints were acquired;
   determining a force value difference between a pair of the determined force values, and
   determining the user input based on the determined force value difference, and based on a relative location between the sub-groups of sensing elements associated with the force value difference,
   wherein the relative location between the sub-groups of sensing elements associated with the force value difference provides directionality for the user input, and an amount of the force value difference provides a speed indication for the user input.

2. The method according to claim 1, comprising:
   determining at least one further force value difference between a respective pair of sub-groups of sensing elements, and
   determining at least one further user input based on the determined at least one further force value difference, and based on a relative location between the respective pair of sub-groups of sensing elements associated with the at least one further force value difference.

3. The method according to claim 2, comprising:
   combining the force value difference, the at least one further force value difference, the relative location between the sub-groups of sensing elements associated with the force value difference, and the relative location between the respective pair of sub-groups of sensing elements associated with the at least one further force value difference to determine the user input.

4. The method according to claim 1, comprising:
   executing a first user input on the electronic device,
   shifting from executing the first user input to executing a second user input by determining a continuous variation in force distribution on the sensing elements in the at least two sub-groups of sensing elements.

5. The method according to claim 1, wherein the sub-groups of sensing elements are non-overlapping sub-groups.

6. The method according to claim 1, wherein the force value difference is a difference or a ratio.

7. A fingerprint sensing system comprising:
   a finger touch surface for receiving a finger having a fingerprint topography;
   an array of sensing elements;
   fingerprint image acquisition circuitry connected to the array of sensing elements for acquiring fingerprint images indicating local distances between the sensing elements and the fingerprint topography; and
   image processing circuitry connected to the fingerprint image acquisition circuitry for:
      controlling the fingerprint image acquisition circuitry to acquire a first time-sequence of partial fingerprint images from at least two sub-groups of sensing elements;
      determining a force applied on each of the sub-groups of sensing elements, based on the partial fingerprint images acquired from each sub-group of sensing elements;
      determining a force value difference between a pair of the determined forces applied on sub-groups of sensing elements, and
      determining a user input based on the determined force value difference, and based on a relative location between the sub-groups of sensing elements in the pair associated with the force value difference,
   wherein the relative location between the sub-groups of sensing elements in the pair associated with the force value difference provides directionality for the user input, and an amount of the force value difference provides a speed indication for the user input.

8. The fingerprint sensing system according to claim 7, comprising four sub-groups of sensing elements.

9. The fingerprint sensing system according to claim 8, wherein the two sub-groups of sensing elements are arranged in a north-south orientation of finger touch surface, and two sub-groups of sensing elements are arranged in a west-east orientation.

10. The fingerprint sensing system according to claim 7, wherein:

each sensing element in the array of sensing elements comprises an electrically conducting sensing structure; and the fingerprint acquisition circuitry is connected to each of the sensing structures for providing sensing signals indicative of a capacitive coupling between each sensing structure and the finger in response to a change in potential difference between a finger potential of the finger and a sensing structure potential of the sensing structure.

11. An electronic device comprising:
the fingerprint sensing system according to claim 7; and
a device control unit configured to:
    execute the user input on the electronic device based on the determined force value difference.

12. The electronic device according to claim 11, wherein the device control unit is configured to:
interact with the fingerprint sensing system to authenticate a user based on a fingerprint representation; and
perform at least one action only when the user is authenticated based on the fingerprint representation.

13. A vehicle comprising the fingerprint sensing system according to claim 7, an electronic vehicle system; and
a control unit configured to:
    execute the user input on the electronic vehicle system based on the determined force value difference.

\* \* \* \* \*